United States Patent [19]

Martin

[11] 3,998,007
[45] Dec. 21, 1976

[54] PLANT SUPPORTING AND WATERING APPARATUS

[76] Inventor: Melvin S. Martin, Martindale, Pa. 17549

[22] Filed: June 16, 1975

[21] Appl. No.: 587,273

[52] U.S. Cl. .................................. 47/39; 47/65; 47/17; 285/150; 285/405

[51] Int. Cl.[2] .................................. A01G 9/24

[58] Field of Search ................... 47/1.2, 17, 19, 29, 47/34, 58, 39; 301/80–84, 105–108; 285/19, 142, 150, 405; 137/375; 251/267

[56] References Cited

UNITED STATES PATENTS

| 915,093 | 3/1909 | Garst | 301/80 X |
|---|---|---|---|
| 937,236 | 10/1909 | Grace | 239/259 X |
| 943,891 | 12/1909 | Rathbun | 285/19 X |
| 2,486,512 | 11/1949 | Armstrong | 47/1.2 |
| 3,167,085 | 1/1965 | Redmer | 251/267 X |
| 3,339,308 | 9/1967 | Clare | 47/1.2 |
| 3,343,300 | 9/1967 | Englert | 47/17 |
| 3,365,840 | 1/1968 | Cooper | 47/1.2 |
| 3,882,634 | 5/1975 | Dedolph | 47/58 X |
| D223,677 | 5/1972 | Weinert | 47/34 X |

FOREIGN PATENTS OR APPLICATIONS

| 1,480,721 | 5/1967 | France | 47/1.2 |
|---|---|---|---|
| 2,461,306 | 10/1975 | Germany | 47/1.2 |

Primary Examiner—Clifford D. Crowder
Assistant Examiner—James R. Feyrer
Attorney, Agent, or Firm—Synnestvedt & Lechner

[57] ABSTRACT

A multiple-shelved unit is disclosed, the unit being adapted for use in greenhouses, for supporting growing plants on the shelves thereof, the unit including a horizontal hollow shaft mounted for rotation and means for rotating the same, hub members carried by the shaft adjacent the ends thereof with each hub member supporting a plurality of radially-projecting hollow spokes and hollow elements carried by the spokes adjacent the outer ends thereof for pivotally supporting the shelves. The unit additionally includes means for connecting the hollow interior of said shaft to a water supply, means for providing water communication between the interior of said shaft and the interiors of the spokes supported by at least one of said hubs, and means for providing water communication between the lastmentioned spokes and the shelves whereby the plants supported by the shelves may be watered at desired intervals. A second similar unit may be employed with its hollow shaft in alignment with and connected to the hollow shaft of the first unit for rotation therewith, the connection in such case including valved means for the passage of water from the shaft of the first unit to the shaft of the second unit. An additional feature is the construction of the hub members which provides both a threaded and clamped connection with the spokes for insurance against the breaking of such connection.

9 Claims, 8 Drawing Figures

FIG. 2
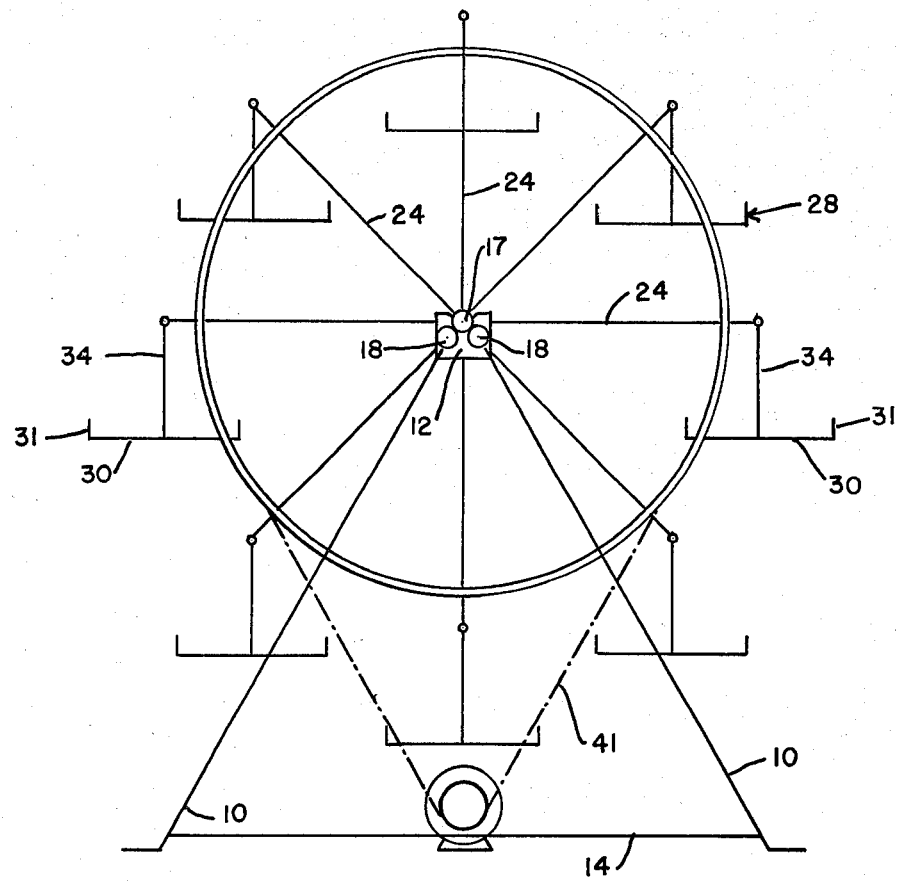
FIG. 6
FIG. 5
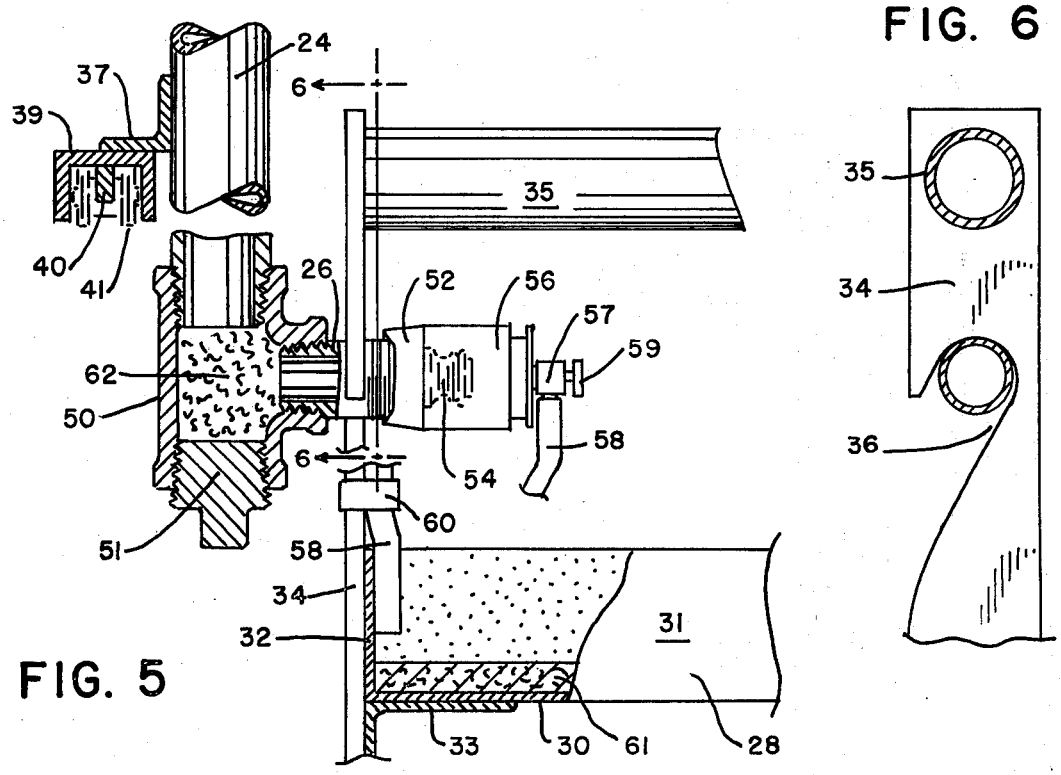

PLANT SUPPORTING AND WATERING APPARATUS

BACKGROUND OF THE INVENTION

1. Field of the Invention

The invention concerns improved multiple-shelved units particularly adapted for use in greenhouses for supporting growing plants whereby the capacity of the greenhouse to accommodate the plants is greatly increased.

2. Description of the Prior Art

Heretofore units for the purpose referred to above have been developed, as illustrated, for example, by that disclosed in patent to Englert U.S. Pat. No. 3,343,300 issued Sep. 26, 1967. The unit of the patent includes spaced wheels mounted for rotation in vertical planes on a central shaft. Each wheel has a plurality of radially-extending spokes with corresponding spokes of each wheel connected by axially-extending rods. The rods are employed to pivotally support plant-carrying trays. In the operation of the unit, the shaft is rotated to in turn rotate the spokes whereby the rods and the trays carried thereby are moved between lower intermediate and elevated positions. A water-spraying device in a fixed position is provided whereby the plants may be sprayed with water as the shelves approach and pass the spraying device.

Also, units of the general type and for use as disclosed in the above-referred-to patent and including certain basic features employed in the units of the present invention have heretofore been commercialized, the units employing piping for various elements thereof. For example, in such prior units the central rotatable shaft is constituted of a section of metal pipe, the shaft-supporting spaced hub members secured thereto by welding or the like. Each hub member includes a plurality of radially-extending threaded sockets which receive threaded ends of radially-projecting pipe sections which define spokes. An outer threaded end of each spoke carries an elbow into a laterally-extending arm of which a threaded nipple is received with the nipples of the corresponding spokes at the opposite ends of the unit projecting towards each other. Each shelf includes uprights at the opposite ends thereof, the uprights having canted slots for the reception of the nipples, such construction permitting the ready removal and replacement of the shelves. In the use of the unit, watering of the plants carried by the shelves is performed manually.

The shafts of the commercially employed units referred to above have, in some instances, been rotated individually by an associated power source. In other instances, two or more of the units have been positioned in longitudinal alignment with couplings between the shafts. In such case, the power source for causing rotation of the shaft of one of the units also serves to rotate the shaft of the coupled unit or units.

The units of both the prior patented and commercially employed constructions described above present various disadvantages. For example, neither of the plant-watering systems previously employed are efficient in operation. When the spraying system is used, the plants are only momentarily subjected to the spray during their passage therethrough, and also the system necessarily results in the discharge of water onto the floor and other elements of the greenhouse. The manual watering of the plants, on the other hand, is excessively time-consuming. With respect to the unit employing pipes for the spokes, the pipes being secured to the hubs solely by the reception of the threaded ends thereof in threaded sockets of the hubs, an additional disadvantage results from the fact that due to the load carried by the spokes, they frequently break at the thread shoulder.

SUMMARY OF THE INVENTION

The principal object of the instant invention is the provision of a multiple-shelved unit for the support of growing plants, the unit including a central rotatable hollow shaft adapted for connection to a water supply and means for the delivery of water from the hollow interior of the shaft directly to the plant-supporting shelves.

Another object of the invention is the provision of a rotatable multiple-shelved unit attaining the foregoing object adapted for joint operation with an endwise adjacent unit of the same type through the connection of the shafts thereof, said connection additionally including means providing water communication at desired times between the hollow interiors of the shafts.

A still further object of the invention is the provision of a multiple-shelved unit for the support of growing plants, the unit including a central shaft mounted for rotation, hubs carried by said shaft adjacent the ends thereof, and spokes radially projecting from said hubs, the construction including improved means for securing threaded ends of the spokes to the hubs which eliminates the danger of breakage of the spokes.

The foregoing and other objects of the invention, which will become apparent, are attained by a unit adapted to be employed alone or in association with an endwise adjacent corresponding unit or units, the unit including a known support structure including spaced bearing elements, the bearing elements supporting a longitudinally-extending, rotatable hollow shaft that serves as a conduit means for carrying water. The interior of the shaft at one end thereof is provided with means of a conventional type for attachment to a hose or other water conduit, the means permitting rotation of the shaft relatively to the conduit. Where the unit is to be employed individually, the hollow interior of the shaft at the other end thereof may be closed off by any suitable stopper means. On the other hand, if the unit is to be employed in aligned association with a similar unit, coupling means is employed between the shafts of the units, the coupling means including means for the flow of water from the hollow shaft of one unit to the hollow shaft of the other unit.

The shaft of the unit carries hub members adjacent each of its ends for the support of radially-projecting hollow spokes, particularly pipe lengths that serve as conduit means for carrying water. The hub members include threaded sockets to receive threaded ends of the spokes and also to embrace portions of the spokes adjacent the threaded ends thereof to insure against breakage of the spokes at the thread shoulders. The wall of the shaft opposite one of the hub members has perforations in alignment with the hollow interiors of the spokes at that end of the unit to provide water communication between the interior of the shaft and the interiors of the spokes. The outer ends of the spokes at both ends of the unit carry pipe fittings adapted to support shelves extending longitudinally of the unit for relative rotational movement. The pipe fittings carried by the spokes, the interiors of which are in communication with the interior of the shaft, are of a character to provide for water communication from the spokes to the fittings and thence through a conduit to the associated shelf. For this purpose they are also of a character which permits elements of the fittings to which the conduit is secured to rotate relatively to the remainder of the fitting and also to be subject to snap removal and replacement.

In the operation of the unit, the shaft is rotated by suitable drive means, causing consequent rotation of the spokes and of the plant-carrying shelves supported thereby. When watering of the plants carried by the shelves is desired, water is supplied to the hollow interior of the shaft, the water passing through the apertures in the shaft into the associated hub and through the spokes carried thereby, the associated pipe fittings and conduits to the shelves. The watering operation may take place either during rotation of the shelves of the unit or while they are stationary.

When it is desired that two or more of the units in aligned adjacent positions be driven by a single power source, a coupling in accordance with the invention is employed, the coupling including means for providing a driving connection between the shafts of the units and also including valved means for providing water communication between shafts.

DESCRIPTION OF THE DRAWINGS

FIG. 2 is an end elevational diagrammatic view of the unit of FIG. 1;

FIG. 5 is a detail view with parts in section and with parts broken away disclosing the shelf-supporting means and the means for supplying water to the shelf;

FIG. 6 is a sectional view taken on the line 6—6 of FIG. 5

Figure 1:
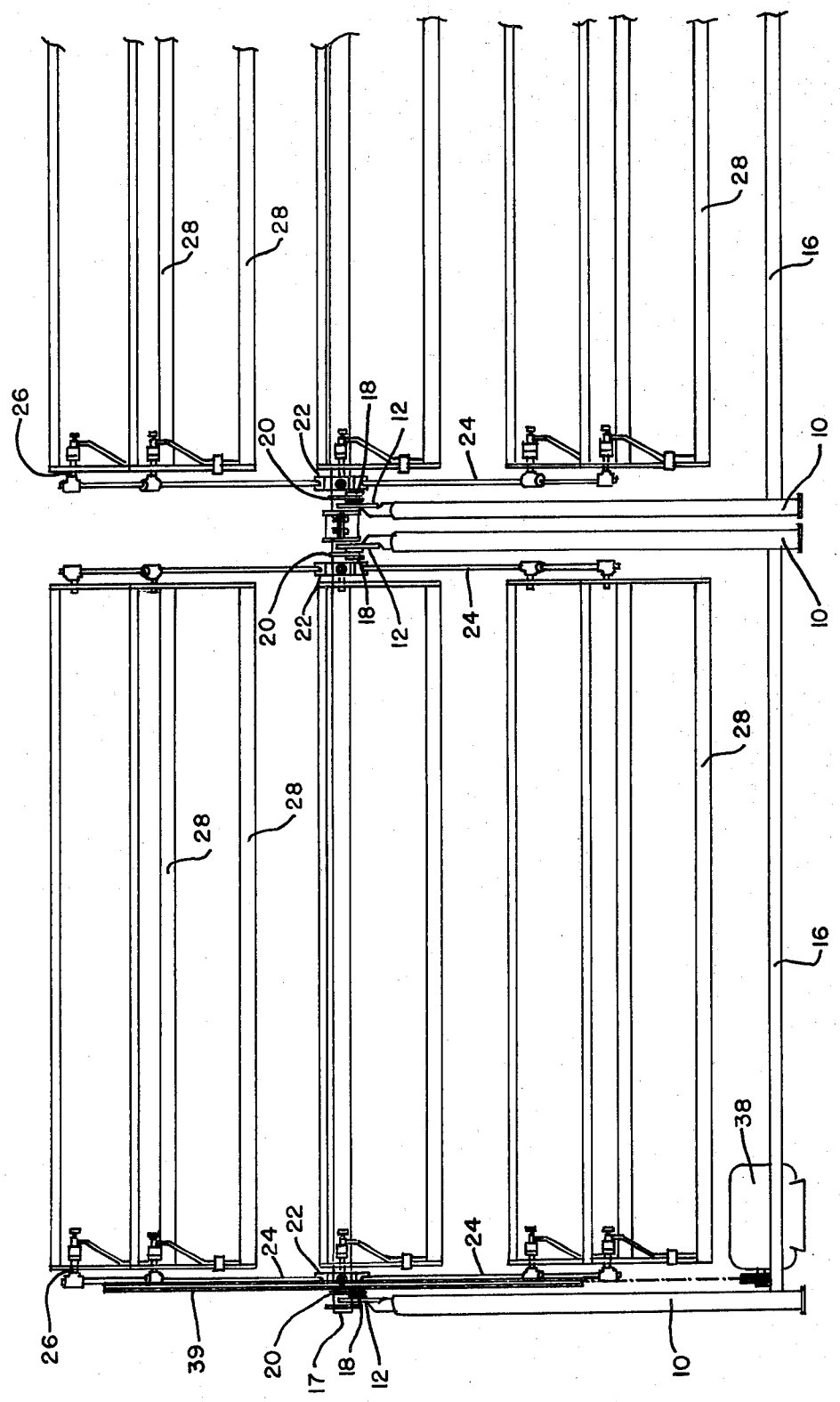
FIG. 1 is a side elevational view of a unit of the instant invention in linear alignment with a second unit.

Referring now to the drawings and particularly to FIGS. 1 and 2, a basic unit in which the present inventive features are incorporated includes a frame structure suitably constructed of pipe sections and other metal parts whereby parts may be secured to other parts as by welding, the frame structure including legs 10 with the legs at each end of the unit defining an inverted V. The upper ends of the legs at each end of the unit are secured to an associated plate 12, and the legs adjacent their lower ends are connected by a member 15, suitably a pipe section. The legs defining the inverted V at one end of the unit are each connected to a corresponding leg at the other end of the unit by transverse members 16, also suitably pipe sections. Each of the plates 12 joining the legs at their upper ends carry bearings for the support of an end portion of a rotatable hollow shaft 17, the bearings suitably including a pair of grooved rollers 18 mounted for rotation on pins projecting from the adjacent plate 12. A collar 20 is affixed to the shaft adjacent each end thereof, the collars being positioned to have peripheral portions thereof received in the grooves of rollers 18 whereby endwise shifting of the shaft is prevented.

Hub members 22 are secured as by welding to the shaft adjacent each of the opposite ends thereof, the hubs each supporting a plurality of radially-extending spokes 24, the spokes being pipe sections, and corresponding spokes at the opposite ends of the unit lying in a common plane. The particular construction of the hub member and the means for securing the spokes thereto incorporate features of the invention and will later be described in detail. Each of the spokes adjacent its outer end carries a horizontally-positioned, inwardly-projecting nipple 26, the nipples supporting shelves 28 for relative rotational or rocking movement thereof. Each nipple 26 carried by the spokes at at least one end of the unit together with associated parts performs an additional function as will later be described. As disclosed particularly in FIGS. 2 and 5, each shelf is constituted of a floor plate 30 having upwardly extending side and end walls 31 and 32 respectively, the shelves resting on and being secured to angle members 33. Vertical support bars 34 are secured to angle members 33 at the midpoint between the ends of the latter, the support bars projecting upwardly and being connected adjacent their upper ends by a transversely-extending member 35, the latter suitably being a pipe section, as illustrated in FIG. 6. Referring particularly to FIGS. 5 and 6, bars 34 intermediate their ends and at points relatively adjacent transverse member 35 are provided with canted slots 36 for reception of the nipples 26. The above-described suspension means for the shelves permits them to maintain substantially horizontal positions upon rotation of the shaft and of the spokes carried thereby. The shelves support the growing plants (not shown).

For a unit which is to be driven directly by a power source rather than by an adjacent unit, such as the unit to the left in FIG. 1, rotation of the hollow shaft 17 and consequent rotation of the spokes and of the shelves carried thereby is attained by a motor 38, a grooved annular ring 39 secured to an annular angle member 37 which in turn is secured to the spokes, and a plurality of spaced pins 40, one of said pins being shown in phantom in FIG. 5 projecting from the bottom of the groove, and a drive chain 41 comprising a succession of links adapted to receive the drive pins.

The features of the unit as described above, except those referred to as incorporating inventive features, are generally of conventional construction and have heretofore been employed in units of the basic type referred to in the description of the prior art.

Figures 3, 4:
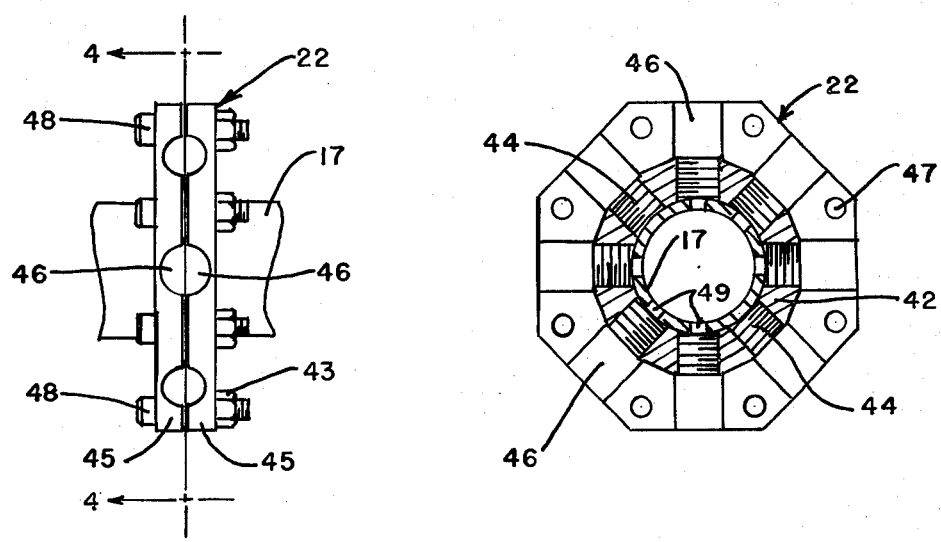
FIG. 3 is a detail view disclosing a hub structure as employed in the unit of the invention.
FIG. 4 is a sectional view taken on the line 4—4 of FIG. 3 looking in the direction indicated by the arrows.

Referring now particularly to FIGS. 3 and 4, the hub elements 22 constructed in accordance with the instant invention will be described. The hub elements each include a body section 42 having radially-extending threaded bores 44 to receive threaded ends of the pipe sections constituting the spokes 24. Body section 42 is secured as be welding to the hollow shaft 17 of the unit. Projecting from the body section are annular opposed flange portions 45 formed integrally with the body section, the flange portions being somewhat spaced as illustrated in FIG. 3, and the flange portions having semicylindrical opposed bores 46 which together form a socket of a diameter to receive an unthreaded portion of a spoke 24, the sockets being in alignment with the threaded bores 44 in the body section. Aligned openings 47 penetrate the flange portions 45 intermediate the spaced sockets defined by the bores 46, the aligned openings being adapted to receive bolts 48. The wall of the shaft is perforated as indicated at 49 in opposed relationship to each of the pipe-receiving sockets. As will be understood, following the screwing of the threaded ends of the spokes into the threaded bores 44, the bolts 48 are inserted in the aligned openings 47 and nuts 49 applied thereto and tightened to cause the flange portions 45 to closely embrace the portions of the spokes adjacent the threaded ends thereof. This construction insures against breakage of the spokes at the threaded ends which has heretofore occurred when the threaded ends provided the entire securing means.

Referring now particularly to FIG. 5, the means for delivering water from the hollow interiors of spokes 24, at at least one end of the unit, through the nipples 26, the nipples also serving as shelf-supporting means as previously noted, will be described. The threaded end of each spoke is received in a threaded end of a T fitting 50 into the opposite end of which a threaded plug 51 is received. A threaded end of nipple 26 is received in the threaded neck of the T fitting and the other end of the nipple is received in an internally threaded portion of an element 52 of a fitting indicated generally by the reference character 53. Fitting 53 is of conventional type and includes means whereby an outer portion 56 has both a swiveled and a readily releasable connection to element 52 of the fitting. Such fittings which are employed for various purposes and are available in hardware stores, plumbing supply stores and the like, are exemplified by those distributed by the Swan Hose Division of Amerace Corporation of Worthington, Ohio. In the fitting 53 as disclosed in FIG. 5 of the instant application, element 52 has an extending neck 54 received for rotation in and for snap connection with a section 56. In accordance with the instant invention, the standard fitting described above is modified to the extent that an elbow member 57 is employed, the elbow member having a horizontal arm secured to, and having its interior in communication with, the interior of section 56 and a vertical arm connected to, and with its interior in communication with, a flexible hose 58 leading to the adjacent end of the associated shelf. The hose adjacent the lower end thereof is secured to the support bar 34 at that end of the shelf by a tape or other suitable securing means 60. A valve 59 of any suitable type, such as one of the petcock type, is preferably employed in elbow member 57 to permit control of the flow of water between the arms of elbow member 57.

The shelves 26 which support the growing plants may employ a mat-type water distribution system, namely a mat which distributes water to the plants by capillary action, a mat of this type being indicated at 61. Alternatively, what is referred to as a spaghetti-type water distribution system may be employed. In the latter system, each individual plant is supplied with water through a small hose. Where either of the above-mentioned or similar water distribution systems are used, the employment of the T fittings 50 at the ends of the spokes with removable plugs 51 in the outer ends of the T's serves an important function in that it permits a suitable filtering material, for example, a wad of fiberglass, as indicated at 62, to be readily inserted into the hollow interiors of the T fittings and to be replaced when required, the filtering material serving to remove particulate matter, such as rust flakes and the like, from the water before the water is discharged onto the shelves. If not filtered out, such particulate matter would tend to interrupt the flow of water through the distribution system.

As mentioned above, the means for supplying water to the shelves is preferably employed only at one end of the unit. In such case, the spokes at the other end of the unit are suitably threaded into elbows which in turn carry the nipples 26, the nipples in such case serving only the function of supporting the corresponding ends of the shelves. However, the water supply means may be employed at both ends of the unit if desired.

Figures 7, 8:
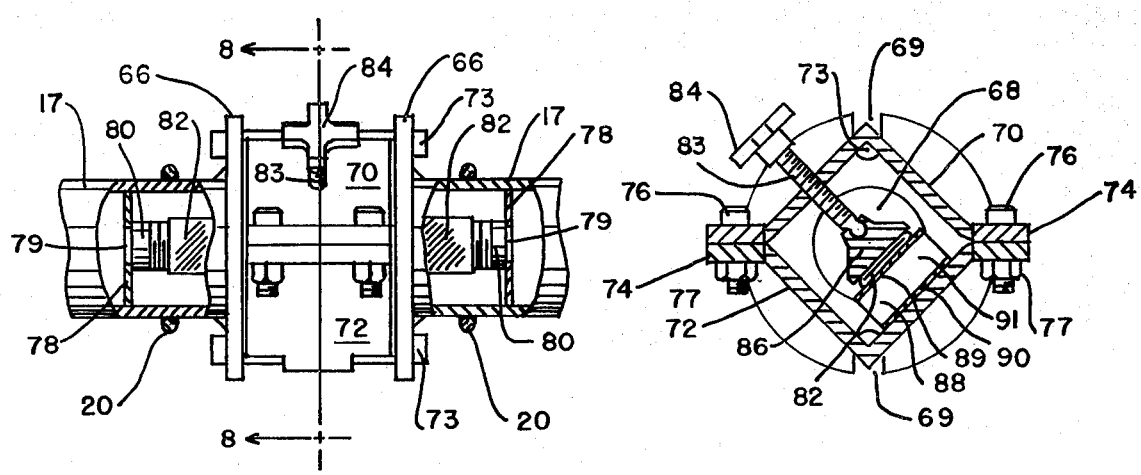
FIG. 7 is an elevational view on an enlarged scale with parts broken away disclosing a member for coupling the shafts of endwise adjacent units.
FIG. 8 is a sectional view taken on the line 8—8 of FIG. 7.

Referring now particularly to FIGS. 1, 7 and 8, the features of the invention by which the ends of the shafts 17 of adjacent units, when the units are placed in longitudinal alignment, are secured to each other not only for conjoint rotation but also for the transmission of water from one shaft to the other will be described. As will be understood, where two or more of the units are employed in alignment, the additional unit or units, such as the one to the right of FIG. 1, are suitably of the same construction as the motor-driven unit except that the drive means comprising the motor 38, annular ring 39, drive chain 41 and other associated parts are omitted.

An annular coupling plate 66, having a central aperture 68 of a diameter approximately equivalent to the external diameter of the hollow shaft 17, is secured to the end of the shaft of the unit to the left in FIG. 1 as by welding, and a second plate 66 is similarly secured to the shaft 16 of the unit to the right in FIG. 1. Each of the plates has diametrically opposed notches 69 extending inwardly from the periphery of the plate. For the coupling operation, the notches of the two plates are brought into axial alignment. The coupling means includes opposed angle members 70 and 72, each angle member being suitably formed of plate elements welded together at a central portion of the apex defined by the plates. Also secured as by welding to the angle members in recessed portions thereof lying outwardly of the welded central portion are projecting rods 73 positioned when the coupling is assembled to be received within notches 69 of the plate elements 66. Each of the angle members has longitudinally-extending flanges 74 suitably secured thereto as by welding, the flanges of the opposed angle members, when assembled, being positioned in lapping relationship and being releasably secured together by bolts 76 projecting through bores in the flanges and nuts 77 threaded onto the bolts.

Circular plates 78 each of a diameter substantially conforming to the inner diameter of the hollow shafts 17 and each having a central aperture 79 are positioned in the hollow shafts adjacent to the ends thereof, each plate being secured to the wall of its associated shaft as by welding. Plates 79 each support a nipple 80 suitably secured to the plate 79, the interior of the nipple being in alignment with the aperture in the plate. The inner ends of the nipples are connected by a flexible hose 82, suitably a vinyl hose, of an internal diameter to snugly receive the ends of the nipples.

A water cut-off or valve structure is mouned at approximately the median point of the hose length, the valve structure comprising a threaded stem 83 received in a threaded aperture in a plate element of one of the angle members, suitably angle member 70 as shown in FIG. 8. An operating handle 84 is secured to the outer projecting end of stem 83. An approximately conically-shaped head 86 having a flat lower face is carried by the inner end of the stem, the flat face of the head lying in opposed relationship to what may be termed an anvil element 88 suitably consisting of upper and lower metal plates 89 and 90 respectively, joined at their ends by vertical walls 91, one of the walls 91 being shown in FIG. 8. The lower plate 90 is secured as by welding to the plate element of angle member 72 lying in opposed relationship to the plate element supporting stem 83. As shown in FIG. 8, the connection of the stem 83 to head 86 is of a ball and socket type adapted to permit self-adjustment of the head relatively to anvil member 88 and to the hose projecting between the head and the anvil member.

As will be noted, FIG. 8 shows the valve in a water cut-off position, namely with head 86 adjacent anvil member 88 and with the hose crushed to a flattened condition therebetween. When water communication between the adjacent units is to be restored, handle member 84 is rotated to withdraw head 86 a sufficient distance from anvil member 88 to permit the hose under the pressure of the water supplied thereto to return to a fully expanded condition.

In the operation of a unit for supporting growing plants as described above, the unit being employed either by itself or in association with a longitudinally-aligned corresponding unit or units, a hose or other water conduit (not shown) leading from a water source is attached to an end of the hollow shaft of the unit, the leading unit if two or more units are connected for joint operation, by a standard rotatable coupling (not shown). When the plants carried by some or all of the shelves 28 require watering, the valve (not shown) controlling the supply of water to the hose or other conduit leading to the hollow interior of the axis is opened and also the valves 59 for those shelves to which water is to be supplied are opened. The water then passes into the interior of the hollow shaft, through apertures 49 into the interiors of the hollow spokes supported by hub member 44 through nipples 26 and fittings 53, to the associated elbow members 57 and the hoses carried thereby and finally to the individual trays.

When two or more of the units are aligned positions with their hollow shafts 17 connected by the valved couplings of FIGS. 7 and 8, preferably water is supplied to the shelves of only one of the units at any given time. If, for example, the plants on the shelves of the leading unit, i.e., the unit to the left in FIG. 1, are to be watered, the valve of the coupling device between the two units is closed. On the other hand, if plants on the shelves of the unit to the right in FIG. 1 are to be watered, the valves 59 of the leading unit are closed and the valve of the coupling device is opened.

As will be understood from the above description of the water delivery system of the instant invention, the ready removability and replaceability of the shelves as afforded by the prior commercially employed units is preserved notwithstanding the fact that the water is delivered directly to the shelves. The only additional operation required when a shelf is to be removed is the outward pulling of section 56 from section 55 of the pipe fitting 53 at that shelf to break the snap connection therebetween. When the shelf is to be replaced, only the reverse of such operation is required.

I claim:

1. In a plant-growing structure comprising a multiple-shelved unit, said unit having a central rotatable, hollow shaft comprising conduit means for carrying a liquid, means supporting said shaft, spaced hub members on said shaft with each of said hub members supporting a plurality of radially-projecting spokes comprising conduit means for carrying a liquid, and means carried by said spokes for suspending shelves therefrom, said suspending means permitting said shelves to maintain substantially horizontal positions during the rotation of said shaft, the improvement wherein said shaft has means for the connection of the hollow interior thereof with a liquid supply, there is means providing communication for liquid between the conduit means of said shaft and the conduit means of the spokes supported by one of said hub members and said shelf-suspending means carried by said last-mentioned spokes comprises means in communication with the conduit means of said last-mentioned spokes for delivering water to said shelves suspended thereby.

2. A plant-growing structure as defined in claim 1 wherein said means for delivering water to said shelves includes valve means.

3. A plant-growing structure as defined in claim 1 wherein said spokes have threaded ends and said hub members supporting said spokes include a body portion having threaded openings for the reception of the threaded ends of said spokes, there are opposed members projecting from said body portion at each of said openings defining sockets for the reception of portions of the spokes adjacent said threaded ends, and there is means for bringing said spaced members into and maintaining them in embracing relationship with said portions of said spokes adjacent said threaded ends.

4. A plant-growing structure comprising a multiple-shelved unit as defined in claim 1 wherein said shelf-suspending means carried by said last-mentioned spokes each includes a sectionalized element having a first section relatively adjacent the associated spoke and a second section projecting therefrom, and means connecting said second section to said first section, said last-named means being constructed and arranged to permit relative rotation of said second section with respect to said first section and its ready removal from said first section.

5. A plant-growing structure as defined in claim 4 wherein said means for delivering water to a shelf additionally includes a flexible conduit connected to said second-mentioned section and leading to an associated shelf.

6. A plant-growing structure as defined in claim 1 wherein there is a second multiple-shelved unit having a central rotatable, hollow shaft, comprising a conduit for carrying liquid said shaft of said second unit being in alignment with the shaft of said first-described unit, and there is means coupling the shafts of said units for joint rotation, said coupling means including means for providing liquid communication between the hollow shafts of said units.

7. A plant-growing structure as defined in claim 6 wherein said coupling means includes valve means for controlling the flow of water through said means for providing liquid communication between said hollow shafts.

8. A plant-growing structure as defined in claim 6 wherein said coupling means comprises a first plate affixed to the shaft of one of said units, said plate having a central aperture to receive the shaft of said unit and said plate including element-receiving means, a second plate affixed to the shaft of the other of said units, said second plate having a central aperture to receive the shaft of said second unit and said second plate including element-receiving means, there is a member having a hollow interior in alignment with the apertures in said plates interposed between said plates, said member having elements projecting from opposite ends thereof for reception in the element-receiving means of said plates, and wherein said means for providing water communication between said hollow shafts of said unit includes a conduit extending through the hollow interior of said member.

9. A plant-growing structure as defined in claim 8 wherein there is means carried by said member for controlling the flow of water through said conduit.

* * * * *

UNITED STATES PATENT AND TRADEMARK OFFICE
CERTIFICATE OF CORRECTION

PATENT NO. : 3,998,007
DATED : December 21, 1976
INVENTOR(S) : Melvin S. Martin

It is certified that error appears in the above—identified patent and that said Letters Patent are hereby corrected as shown below:

Col. 3, line 56 - "15" should read --14--.

Col. 4, line 56 - "be" should read --by--.

Col. 6, line 58 - "mouned" should read --mounted--.

Col. 7, line 31 - "axis" should read --axle--.

Claim 7, line 3 - "water" should read --liquid--.

Signed and Sealed this

First Day of March 1977

[SEAL]

Attest:

RUTH C. MASON
*Attesting Officer*

C. MARSHALL DANN
*Commissioner of Patents and Trademarks*